A. KING.
TRANSMISSION SPEED REDUCING GEARING.
APPLICATION FILED DEC. 21, 1911.

1,061,677.

Patented May 13, 1913.

3 SHEETS—SHEET 3.

Attest:
Wm. H. Scott.
F. D. Rayburn.

Inventor:
Arthur King,
by Ralph Ralph
atty.

UNITED STATES PATENT OFFICE.

ARTHUR KING, OF ST. LOUIS, MISSOURI.

TRANSMISSION-SPEED-REDUCING GEARING.

1,061,677.　　　　Specification of Letters Patent.　　Patented May 13, 1913.

Application filed December 21, 1911.　Serial No. 667,149.

*To all whom it may concern:*

Be it known that I, ARTHUR KING, a citizen of the United States, residing at the city of St. Louis, State of Missouri, have invented a certain new and useful Improvement in Transmission - Speed - Reducing Gearing, of which the following is a specification, reference being had to the accompanying drawings, forming a part hereof, in which—

Figure 1:
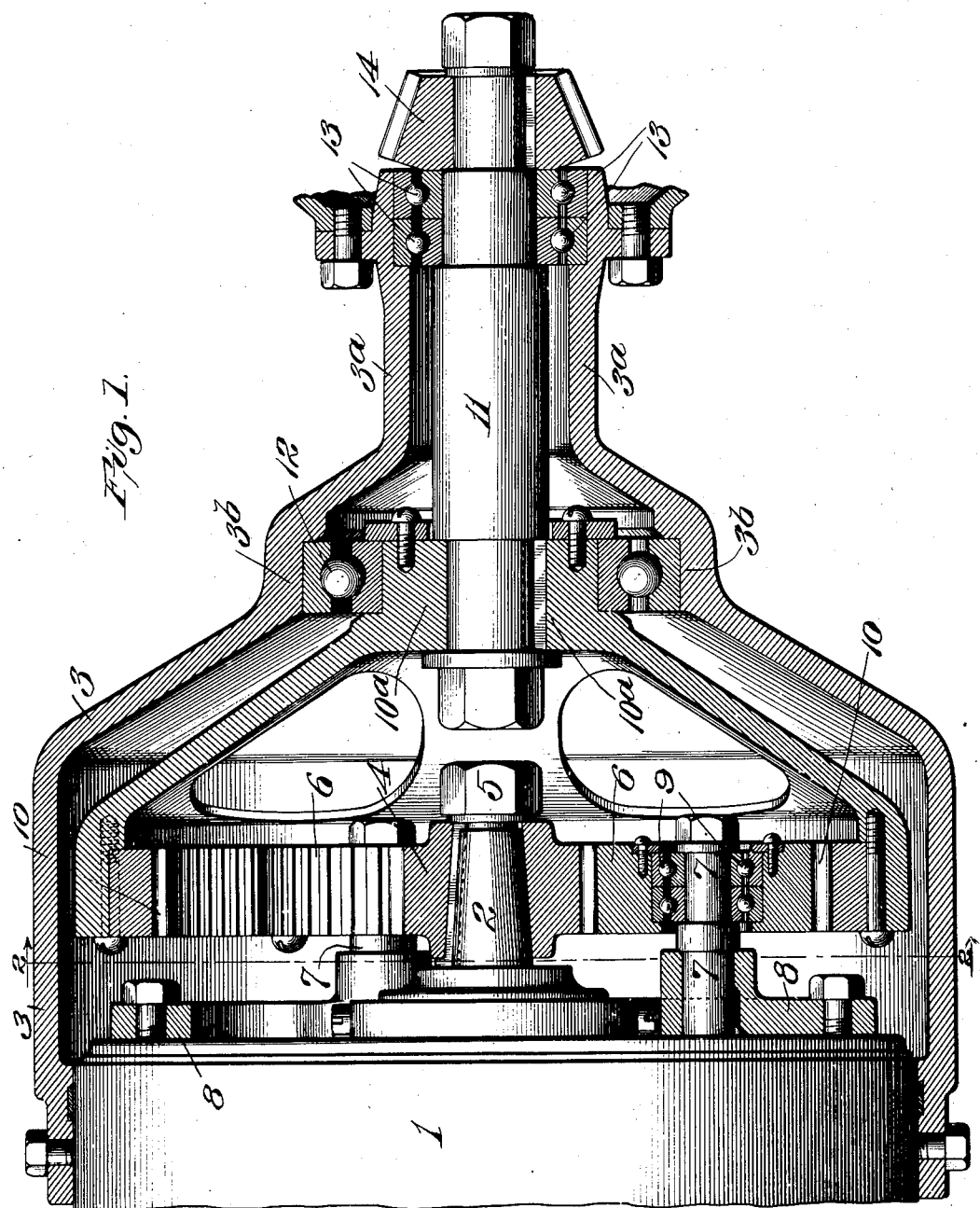
Figure 2:
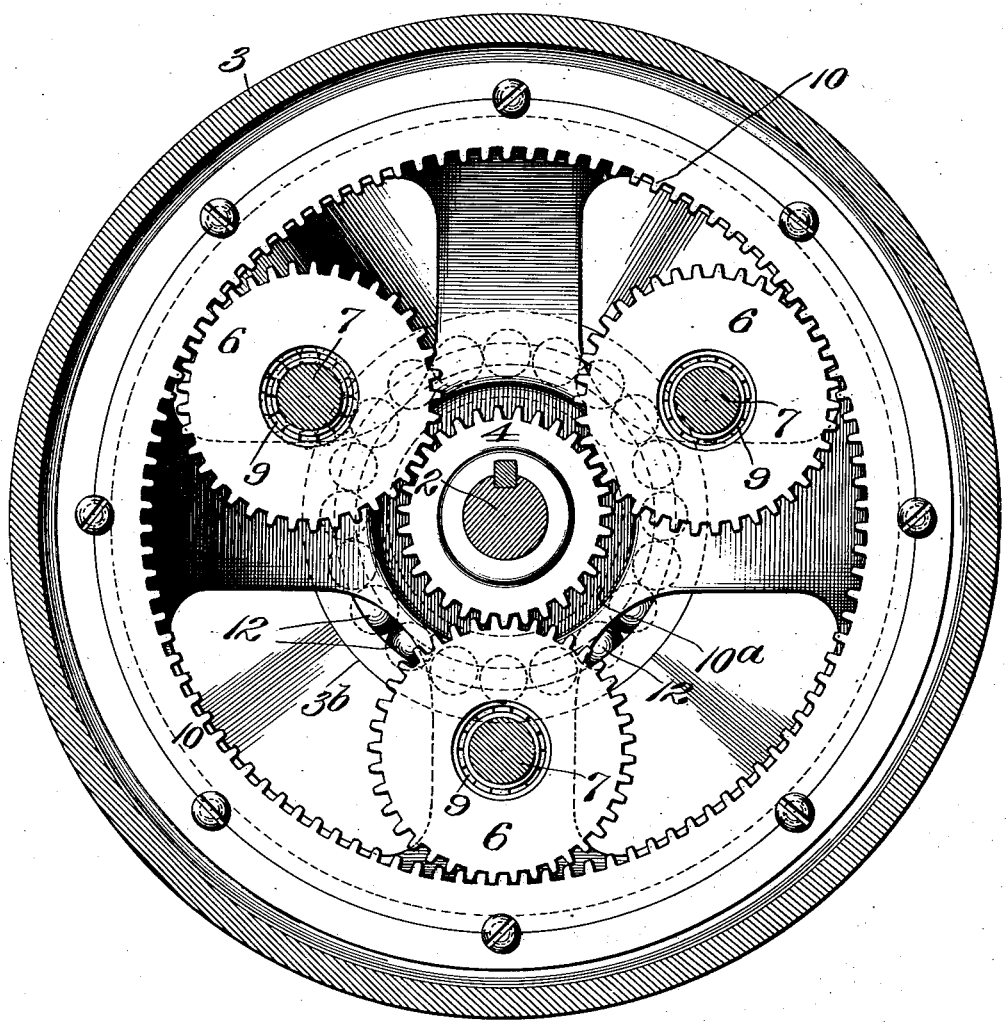
Figure 3:
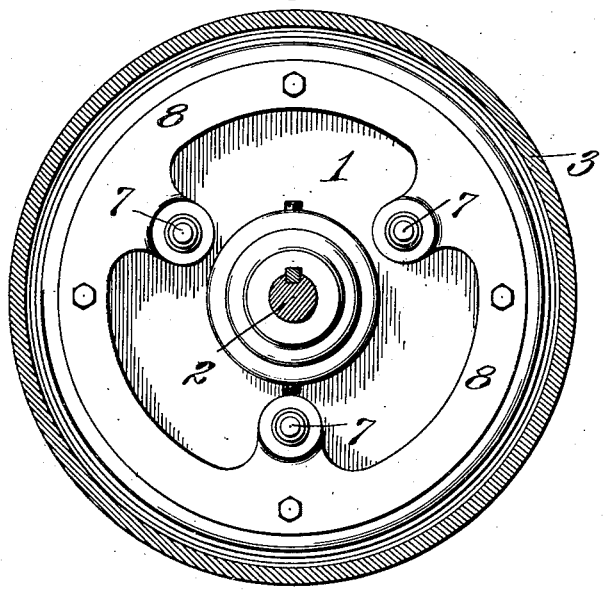
Figure 4:
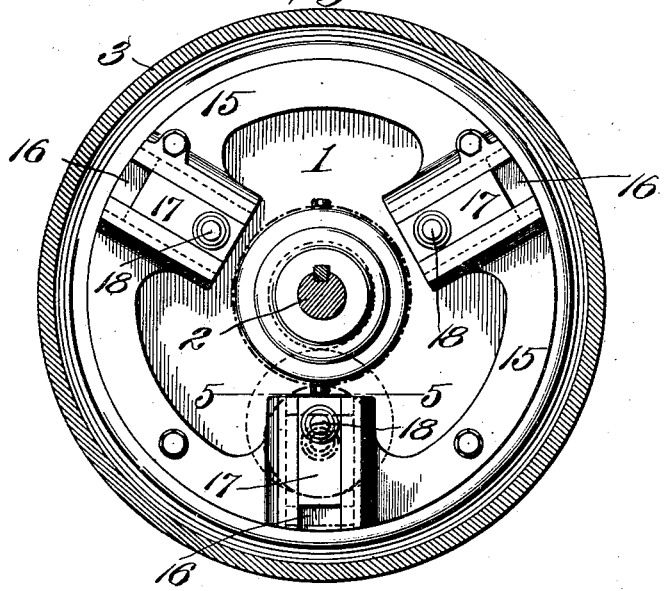
Figure 5:
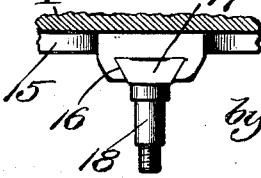

Figure 1 is a longitudinal sectional view of a transmission speed-reducing gearing embodying my invention; Fig. 2 is a transverse sectional view thereof on the line 2—2, Fig. 1, looking in the direction of the arrow; Fig. 3 is also a transverse sectional view, on a reduced scale, taken approximately on the same line as Fig. 2, but looking in the reverse or opposite direction; Fig. 4 is a view similar to Fig. 3, but illustrating a modified form of stud-supporting ring and stud-mounting; and Fig. 5 is a detail sectional view on the line 5—5, Fig. 4.

This invention relates to a certain new and useful improvement in transmission speed-reducing gearing, the objects of my invention being to provide a transmission gearing positive in its operation and of comparatively simple construction, which is adapted to be readily used and arranged in operative connection with engine, motor, or other driving or power-shafts and to vary, change, or reduce the speed of the driven shaft relatively to the speed of the driving-shaft, and in which speed-varying or reducing gears of various relative sizes or diameter may be easily substituted or interchanged and the ratio of speed-reduction or speed variation from the driving-shaft to the driven shaft thereby altered or regulated; and to improve generally upon gearing of the kind stated.

With these objects in view, my invention resides in the novel construction, arrangement, and combination of the several parts of my new gearing, all as will hereinafter be described and afterward pointed out in the claims.

My new transmission gearing is adapted to be used or employed with a driving-shaft mounted in, or arranged in connection with, any suitable support permanently stationary and fixed in position relatively thereto, and for purposes of illustration I have shown my invention in the accompanying drawings in connection with the armature-shaft 2 of a motor 1 of any usual construction, shaft 2 being preferably tapered at its end, as shown.

3 indicates a housing or casing bolted or otherwise suitably secured at one end to, and extending outwardly from, motor 1 and having preferably the shape or form as shown in Fig. 1, being preferably cylindrical, and having a diameter approximately or substantially the same as that of the motor 1 to which it may be secured for a suitable distance outwardly from its supporting end, and then blending obliquely or conically into, and terminating in, a cylindrical bearing-extension or neck $3^a$ of reduced diameter.

Feathered or otherwise suitably secured on the end of shaft 2 and within the enlarged cylindrical portion of housing 3, is a pinion or spur-gear 4 of suitable size, said pinion or spur-gear 4 being preferably suitably removably held in place on shaft 2, as by means of a nut or the like 5 threaded on the end of shaft 2. Meshing with, and adapted to be rotated by, said pinion or spur-gear 4 are a plurality of pinions or spur-gears 6 having the same size or diameter with each other, as shown, rotatably mounted upon studs, pins, or the like 7 preferably arranged equidistantly apart around, said gear 4 and suitably supported in and by a ring or spider-shaped plate or the like 8 bolted or otherwise suitably secured or fastened in proper position on the outer face of motor 1 and surrounding shaft 2, as shown particularly in Fig. 1. In order that said pinions or gears 6 may rotate with little or no friction on said studs 7, suitable ball or other anti-friction bearings 9 are preferably interposed, and suitably secured in position, between each of said studs 7 and its respective pinion 6, as shown particularly in Figs. 1 and 2.

10 indicates an enlarged internal gear adapted to mesh or coöperate with, and be rotated by, said gears 6, the spokes of this gear 10 preferably extending from the rim thereof obliquely outwardly and at an angle preferably co-incident with the conical portion of housing 3, as shown, and merging into a hub $10^a$, in or to which is fixedly secured or otherwise suitably connected one end of a driven shaft 11. In order that said internal gear 10 may also rotate with little or no friction, a suitable ball or other anti-friction bearing 12 is preferably interposed, and suitably secured in position, between the hub 10$^a$ thereof and an off-set 3$^b$ formed in the conical portion of housing 3, as shown particularly in Fig. 1. Shaft 11 extends outwardly from hub 10$^a$ through said neck portion 3$^a$ and preferably has feathered or otherwise suitably secured on its outer end a suitable beveled gear 14 adapted to mesh with, and thereby operate or drive, any usual or ordinary shaft-driven mechanism, a suitable ball or other anti-friction bearing 13 being preferably interposed, and suitably secured in position, between said neck 3$^a$ and said shaft 11 adjacent its outer end, as shown particularly in Fig. 1.

Gear 4 is preferably relatively of smaller size or diameter than the size or diameter of gears 6; hence gears 6, in making one complete revolution, will rotate more slowly than gear 4, the speed of rotation of driven shaft 11 being consequently proportionately reduced or varied relatively to the speed of rotation of driving-shaft 2. It will be clear that, depending upon the relative sizes or diameters of gears 4 and 6, the ratio of speed-reduction or variation from driving-shaft 2 to driven shaft 11 may be regulated as desired, the smaller the gear 4 and the larger the gears 6, the less the speed of rotation of driven shaft 11 relatively to the speed of rotation of driving-shaft 2. It will reversely likewise be clear that the larger the gear 4 and the smaller the gears 6, the greater will be the speed of rotation of driven shaft 11 relatively to the speed of rotation of driving shaft 2.

To substitute other coöperating gears 4 and 6 of varying or different relative sizes for present gears 4 and 6 and thereby vary or change the ratio of speed-reduction or variation from the driving-shaft 2 to driven shaft 11, it is merely necessary to replace present gear 4 with another similar gear having the proper relative size desired and replace ring 8 with another such ring having the pinion-supporting studs 7 properly positioned to accommodate substituted gears 6 of proper relative size to coöperate and mesh with internal gear 10 and substituted gear 4, as will be understood. As this replacing of ring 8 to accommodate different sized gears 6 to coöperate and mesh with gear 10 and with gear 4 on shaft 2 would require a supply of such plates 8 having the pinion-supporting studs 7 accordingly variously positioned thereon, I have shown in Figs. 4 and 5 a modified form of my invention. In this form, the plate or pinion-supporting ring 15 is provided equidistantly apart at its periphery with a plurality of slide or guide-ways 16, in each of which slidably fits a plate or block 17 having mounted thereon, or integral therewith, a pinion-supporting stud 18. By this latter construction, it will be seen that said blocks 17 may be adjusted inwardly or outwardly to accommodate on the said ring 15 gears 6 of varying diameter to mesh and coöperate with gear 10 and with the gear 4 on shaft 2. Preferably these blocks or plates 17 are loose in their respective guide or slide-ways 16, the particular pinions or gears 6 mounted thereon, on meshing with gear 10 and with the gear 4 on shaft 2, being thereby held in proper operative or meshing position.

It will be seen that my new gearing as herein described is comparatively simple, is positive in its operation, will not readily get out of order, is practically dust and weather-proof, and provides means whereby the ratio of speed-reduction or variation from the driving-shaft to the driven shaft may be readily altered or varied as desired.

While I have herein shown and described my new gearing in connection with the armature or driving-shaft of a motor, yet it is to be understood that my new gearing may equally well be used in connection with other speed or power transmitting driving-shafts.

I am aware that minor changes in the arrangement, construction, and combination of the several parts of my new gearing may be made and substituted for those herein shown and described without departing from the nature and principle of my invention.

Having thus described my invention, what I claim and desire to secure by Letters Patent is;

1. In a transmission gearing, the combination with a driving shaft, of a gear wheel mounted on said shaft and rotatable therewith, an internal gear surrounding said gear wheel and having its hub to one side thereof, a shaft having connection with said internal-gear-hub and adapted to be driven by said internal gear, a stationary pinion-supporting ring mounted in operative position relatively to said gear-wheel, a plurality of pinion-supporting studs mounted on said ring and immovable about said driving shaft, a plurality of pinions rotatably mounted on said studs and interposed between, and adapted to coöperate and mesh with, said gear-wheel and said internal gear, and a housing surrounding said gearing and adapted to provide a bearing for the hub of said internal gear; substantially as described.

2. In a transmission gearing, the combination with a driving shaft, of a gear wheel mounted on said shaft and rotatable therewith, an internal gear surrounding said gear wheel and having its hub to one side thereof, a shaft having connection at one end with said internal-gear-hub and adapted to be driven by said internal gear, a stationary pinion-supporting ring mounted in operative position relatively to said gear-wheel, a plurality of pinion-supporting studs mounted on said ring and immovable about said driving-shaft, a plurality of pinions rotatably mounted on said studs and interposed between, and adapted to coöperate and mesh with, said gear-wheel and said internal gear, and a housing surrounding said gearing and adapted to provide a bearing for said hub and for the other end of said driven shaft; substantially as described.

3. In a transmission gearing, the combination with a driving shaft, of a gear-wheel mounted on said shaft and rotatable therewith, an internal gear surrounding said gear-wheel and having its hub to one side thereof, a shaft having connection at one end with said internal-gear-hub and adapted to be driven by said internal gear, a stationary pinion-supporting ring mounted in operative position relatively to said gear-wheel, a plurality of pinion-supporting studs mounted on said ring and immovable about said driving-shaft, a plurality of pinions rotatably mounted on said studs and interposed between, and adapted to coöperate and mesh with, said gear-wheel and said internal gear, said pinions being of the same diameter with each other, but varying in diameter relatively to said gear-wheel, and a housing surrounding said gearing and adapted to provide a bearing for said hub and for the other end of said driven shaft; substantially as described.

4. In a transmission gearing, the combination with a driving shaft, of a gear-wheel mounted on said shaft and rotatable therewith, an internal gear surrounding said gear-wheel and having its hub to one side thereof, a shaft connected at one end to said internal-gear-hub and adapted to be driven by said internal gear, a support permanently stationary and fixed in position relatively to said driving-shaft, a pinion-supporting ring fastened to said support in operative position relatively to said gear-wheel, a plurality of pinion-supporting studs mounted on said ring and immovable about said driving shaft, a plurality of pinions rotatably mounted on said studs and interposed between, and adapted to coöperate and mesh with, said gear-wheel and said internal gear, said pinions being of the same diameter with each other, but varying in diameter relatively to said gear-wheel, a housing fixedly connected to said support and surrounding said gearing and adapted to provide a bearing for said hub and for the other end of said driven shaft; substantially as described.

In testimony whereof, I have signed my name to this specification, in the presence of two subscribing witnesses.

ARTHUR KING.

Witnesses:
RUTH PETERSON,
WILLI BROWN.